United States Patent [19]

Fabbri

[11] Patent Number: 5,058,466

[45] Date of Patent: Oct. 22, 1991

[54] DEVICE FOR INSERTING POLYGONAL AND SHAPED BARS IN THE COLLET OF A CHUCK OF MACHINE TOOLS

[75] Inventor: Vladimiro Fabbri, Faenza, Italy

[73] Assignee: I.E.M.C.A. S.p.A. Industria Elettromeccanica Complessi Automatici, Faenza, Italy

[21] Appl. No.: 362,739

[22] Filed: Jun. 7, 1989

[30] Foreign Application Priority Data

Jun. 22, 1988 [IT] Italy .................. 3518 A/88

[51] Int. Cl.5 .............................. B23B 13/02
[52] U.S. Cl. ......................... 82/126; 82/127; 29/41; 29/561
[58] Field of Search .............. 29/35.5, 37 R, 38 B, 29/38 R, 40, 41, 43, 45, 563, 718, 561; 82/124, 126, 127; 414/14, 18; 173/159, 164; 279/62; 72/84

[56] References Cited

U.S. PATENT DOCUMENTS

| | | | |
|---|---|---|---|
| 3,066,806 | 12/1962 | Lakins et al. | 82/126 X |
| 3,147,653 | 9/1964 | Jones, Jr. | 82/126 X |
| 3,664,215 | 5/1972 | Selby | 82/127 |
| 4,090,423 | 5/1978 | Waage | 82/127 X |
| 4,298,076 | 11/1981 | Winsor et al. | 173/164 |
| 4,324,162 | 4/1982 | Uehara | 82/127 |

Primary Examiner—Joseph M. Gorski
Assistant Examiner—Peter, Dung Vo
Attorney, Agent, or Firm—Guido Modiano; Albert Josif

[57] ABSTRACT

The device for inserting polygonal and shaped bars in the collet of the chuck of machine tools comprises a bar pusher element arranged inside a bar guiding channel and a motor element connected to a worm screw which cause sliding of a slider rigidly associated with the bar pusher. The device has a spring mounted in abutment against the worm screw and adapted to be compressed when the bar rests frontally on the collet of the rotating chuck, so as to absorb the thrust of the motor and to press the bar against the collet, and a motor switch activated by the compression of the spring until the rotation of the chuck causes the chuck to be brought angularly in step with the bar and the bar to be inserted in the collet.

3 Claims, 2 Drawing Sheets

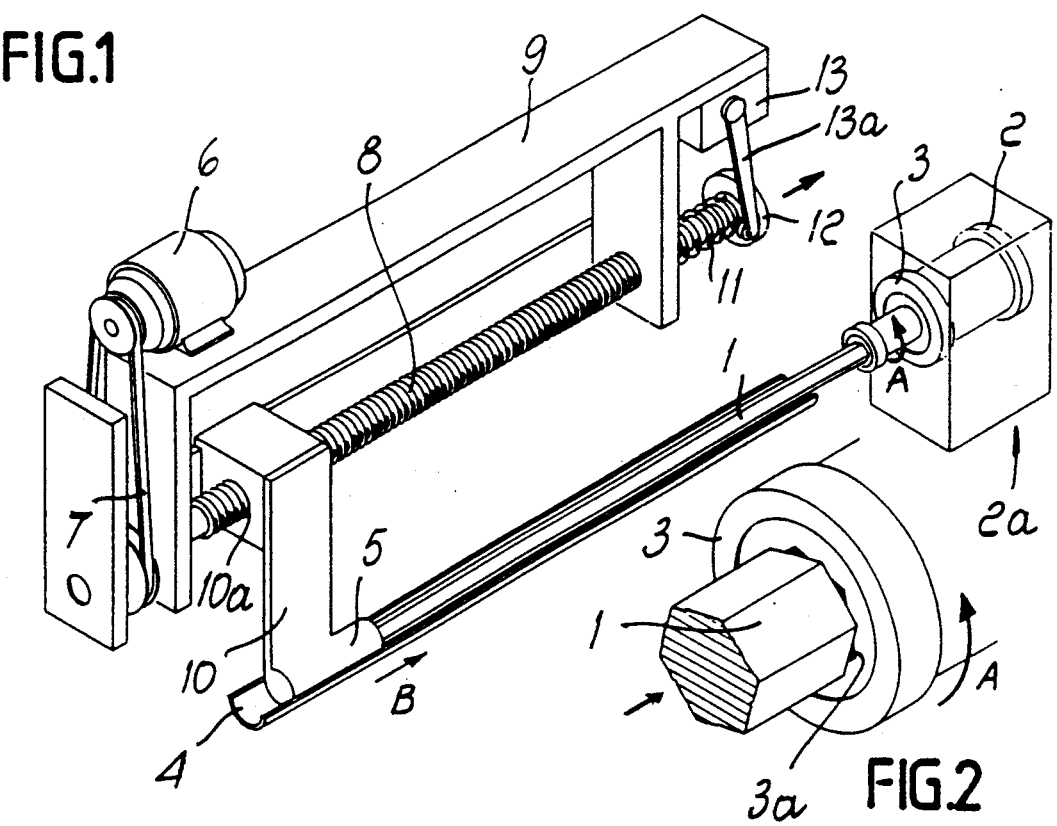
FIG.1
FIG.2
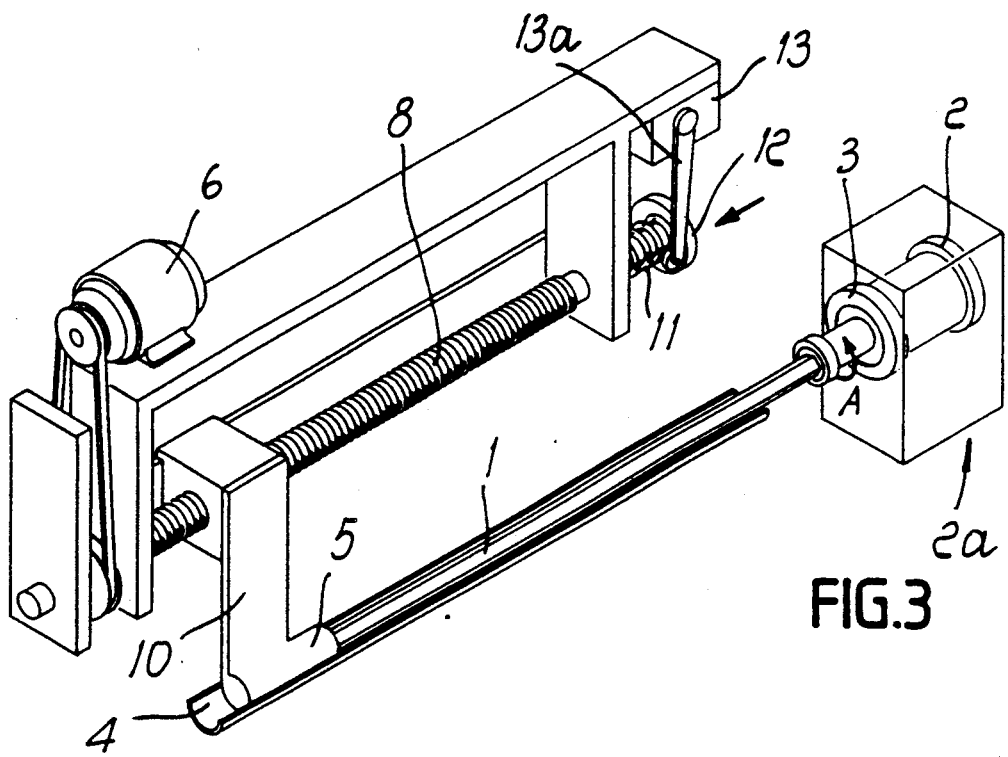
FIG.3

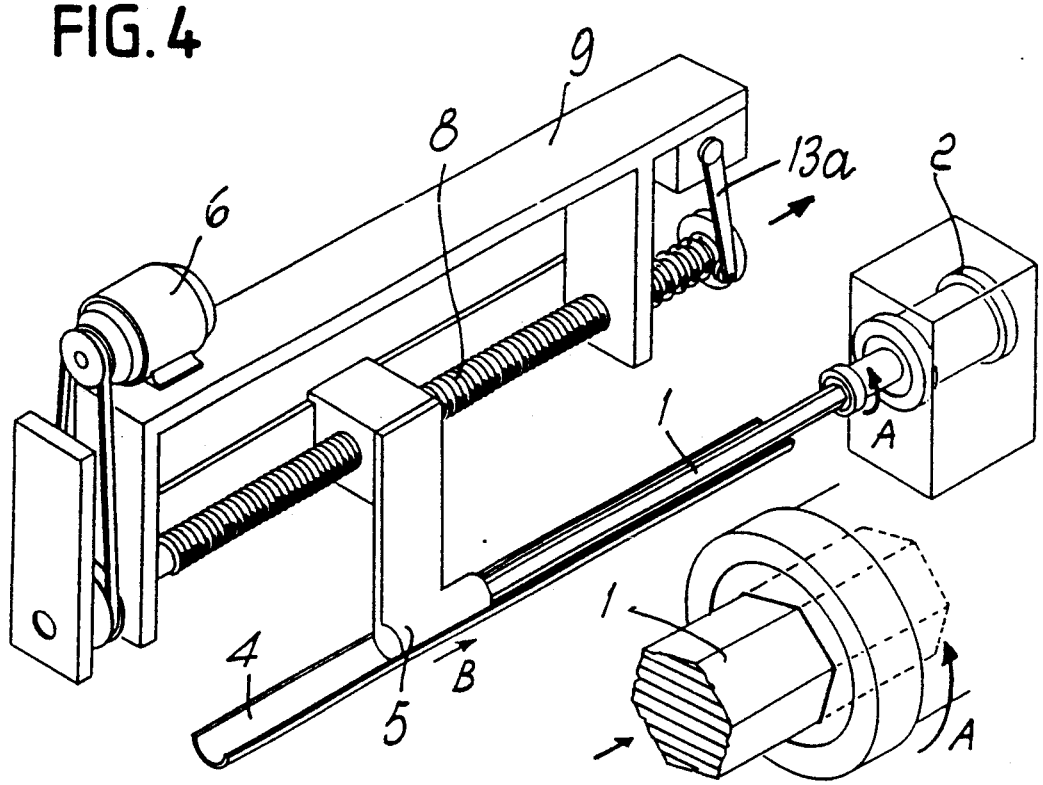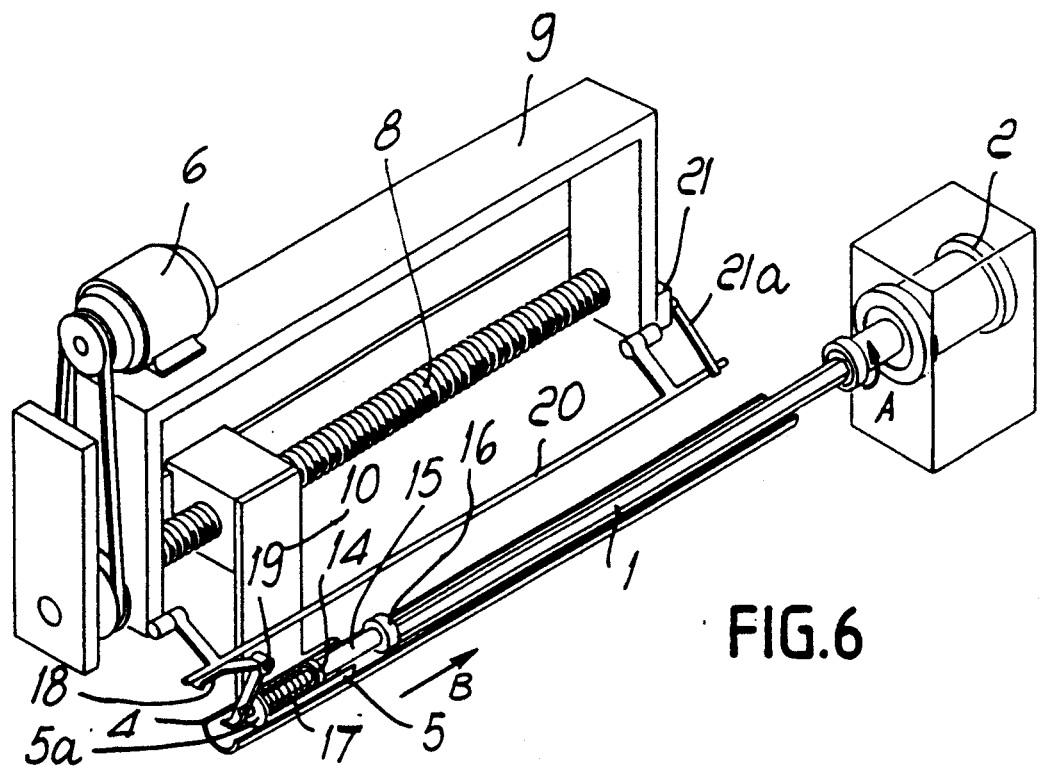

DEVICE FOR INSERTING POLYGONAL AND SHAPED BARS IN THE COLLET OF A CHUCK OF MACHINE TOOLS

BACKGROUND OF THE INVENTION

The present invention relates to a device for inserting polygonal and shaped bars in the collet of a chuck of machine tools.

As is known, in most automatic bar-loaders for lathes the bar to be inserted in the collet of the chuck is arranged within a tubular guide and is pushed forwards by a bar pusher. When a high thrust force is required, the advancement system is constituted by a motor coupled to a worm screw.

This system has no disadvantages in the case of bars with circular cross section; vice versa, in the case of shaped bars, in order to allow insertion the profile of the bar and that of the collet must coincide during insertion. Even if the chuck is rotating, the bar in fact fails to enter the collet, since it is forcefully pushed against the non-complementary surface and it too is rotated, preserving an angular offset. On the other hand, even if the bar is not rotated, the moment during which it is in step with the collet is very short, and insertion is impossible since the advancement system has considerable inertia.

SUMMARY OF THE INVENTION

The aim of the present invention is to solve the above described problem by providing a device capable of regularizing the thrust force and of reducing the inertia of the advancement system so as to allow polygonal and shaped bars to be inserted in the collet of a chuck.

Within this aim, an object of the present invention is to provide a device which is simple in concept, safely reliable in operation and versatile in use.

This aim and this object are both achieved, according to the invention, by the present device for inserting polygonal and shaped bars in the collet of a chuck, as defined in the appended claims.

BRIEF DESCRIPTION OF THE DRAWINGS

The invention will become apparent from the detailed description of preferred embodiments of the device for inserting polygonal and shaped bars in the collet of a chuck, illustrated only by way of non-limitative example in the accompanying drawings, wherein:

FIG. 1 is a perspective view of the present bar insertion device;

FIG. 2 is a detail view of the bar resting region on said collet;

FIGS. 3 and 4 are similar perspective views of the device in successive operation steps;

FIG. 5 is a detail view, corresponding to the view of FIG. 2, with the collet moved angularly in step with said bar;

FIG. 6 is a perspective view of a different embodiment of the present device.

DESCRIPTION OF THE PREFERRED EMBODIMENTS

With reference to FIGS. 1 to 5, 1 indicates a bar to be inserted in a collet 2 of a lathe chuck schematically indicated at 2a; the chuck is rotated in the direction indicated by the arrow A. The collet 2 is frontally provided with a centering ring 3 which has an opening 3a shaped according to the profile of the bar.

The bar 1 is arranged in a guiding channel 4 which is axially aligned with the chuck. A bar pusher 5 acts on the bar and is actuated by an appropriate advancement device in the direction indicated by the arrow B. Said advancement device has a motor element 6 adapted to rotate a worm screw 8 through a transmission element 7. Said worm screw 8 is rotatably supported by a fixed frame 9 and is axially slidable along a direction which is parallel to the bar guiding channel 4. A slider 10 is coupled to the worm screw 8 and is rigid with the bar pusher 5; the slider is coupled to the screw by a corresponding female thread 10a.

A helical spring 11 is mounted on an end portion of the worm screw 8 and abuts against the supporting frame 9 on one side and a ring 12 on the other; said ring 12 is fixed to the end of said worm screw, and is adapted to activate a microswitch 13 intended to control the actuation of the motor 6 as specified hereinafter. In particular, as visible from the drawing, the microswitch 13 has an actuation arm 3a, the free end whereof is engaged by the ring 12 so that the movement of the screw 8 in the direction of the arrow of FIG. 3 causes a correspondent swinging movement of the arm 13a and activation of the microswitch 13.

The operation of the device is easily understandable from the above description. The bar 1 is pushed towards the collet 2 of the chuck (FIG. 1) by the advancement of the slider 10, which is caused by the rotation of the worm screw 8 actuated by the motor 6. When the bar 1 and the collet 2 are not in step, i.e. when the respective profiles do not coincide, the bar is pushed to abut against the centering ring 3 without entering the opening 3a (FIG. 2), preventing the further advancement of the slider 10.

Since the motor 6 continues to rotate the worm screw 8, said screw is axially moved in a direction which is opposite to the advancement direction of the slider 10, compressing the spring 11, until it activates the microswitch 13 by means of the ring 12 and actuation arm 13a (FIG. 3). The activation of the microswitch 13 stops the motor 6; the worm screw 8 remains biased by the spring 11, the pressure whereof is discharged by means of the slider 10 onto the bar 1 which rests against the rotating chuck.

As soon as the rotating chuck is in step with the bar, said bar enters the collet 2 (FIG. 5) under the thrust of the spring 11. The movement of the bar allows the worm screw 8 to return to its initial position due to the extension of the previously compressed spring 11, and the actuation arm 13a may swing back to its initial position by virtue of elastic return means (not shown), so that the microswitch 13 is deactivated (FIG. 4) and the motor 6 starts running again, continuing to advance said bar.

To summarize, when the bar 1 and the collet 2 are not in step the device absorbs the thrust of the motor 6 by loading the compression spring 11. In this step the bar is biased by the spring 11 with a conveniently adjusted force. In order to facilitate insertion, while the microswitch 13 is activated an intermittent actuation can be sent to the lathe motor, so as to vary its rotation rate. When the bar enters the collet the microswitch is deactivated and the motor returns to its normal speed.

FIG. 6 illustrates a different embodiment of the invention, which operates on the basis of the same concepts and has corresponding operation steps. In this case, the bar-pusher 5 is tubular and slidingly accommodates a small piston 14 rigid with a center portion of a stem 15; one end of said stem 15 defines a cylindrical pusher 16 intended to act on the bar 1, while the opposite or rear end protrudes from the bar pusher 5. The piston 14 is pushed by a helical spring 17 which is accommodated inside the bar pusher and acts between a wall 5a of the bar pusher 5 and the piston 14 towards the bar.

As the slider 10 continues to advance by virtue of the motor 6, resting of the bar 1 on the collet 2 compresses the spring 17 and causes the rear end of the stem 15 to protrude from the bar pusher. A V-shaped lever 18 rests with an arm thereof on the stem 15 and is articulated to a pivot 19 rigidly associated with the slider 10. A rod 20 rests on the other arm of the lever 18 and is parallel to the worm screw 8; said rod is furthermore articulated to the frame 9, and actuates the motor 6 by means of a microswitch 21. In this manner, when the stem protrudes from the rear end of the bar pusher, it causes the lever 18 to rotate, the rod 20 to rise, and the microswitch 21 to be thus activated through actuation arm 21a.

In the practical embodiment of the invention, the materials employed, as well as the shapes and dimensions, may be any according to the requirements.

I claim:

1. In a device for inserting a polygonal bar into a collet of a rotating chuck, said collet having an opening complementary to the cross-section of the bar, the device comprising a guiding channel for the bar axially aligned with said chuck, a bar pusher slidable along said channel, means for advancing and retracting said bar pusher along said channel, said means comprising a frame, a worm screw rotatably supported on said frame and extending parallel to said channel, a motor for driving said worm screw, and a slider in engagement on said screw and connected to said bar pusher, the improvement comprising means for slidingly supporting said worm screw, an abutting ring fixed to said worm screw, spring means mounted on said worm screw and abutting against said frame and said ring, said spring means being compressed when the bar acts frontally on said collet, and switch means operatively connected to said ring and controlling said motor so as to cause the opening of said collet to be brought in angular matching with said bar to permit said bar to enter said opening of said collet owing to said compressed spring means.

2. In a device for inserting a polygonal bar into a collet for a rotating chuck, said collet having an opening complementary to the cross-section of the bar, the device comprising a guiding channel for the bar axially aligned with said chuck, a bar pusher slidable along said channel, means for advancing and retracting said bar pusher along said channel, said means comprising a frame, a worm screw rotatably supported on said frame and extending parallel to said channel, a motor for driving said worm screw, and a slider in engagement on said screw and connected to said bar pusher, the improvement comprising a tubular portion formed in said bar pusher, a stem axially extending through said tubular portion, said stem having an end engaging a bar and the opposite end potruding from said tubular portion, a piston rigid with said stem and slidingly guided in said tubular portion, spring means mounted on said stem and abutting against said piston and said tubular portion, said spring means being compressed when the bar acts frontally on said collet, switch means controlling said motor, level means operatively connecting said stem with said switch means to control said motor so as to cause the opening of said collet to be brought in angular matching with said bar to permit said bar to enter said opening of said collet owing to said compressed spring means.

3. The device as claimed in claim 2 wherein said lever means comprises a rod parallel to said guiding channel and articulated to said frame and a two arm levers articulated to said slider and having a first arm engaging said protruding end and a second arm engaging said rod, said rod being operatively associated with said switch means.

* * * * *